S. G. JOHNSTON.
BURNER.
APPLICATION FILED SEPT. 2, 1914.
1,134,863.
Patented Apr. 6, 1915.
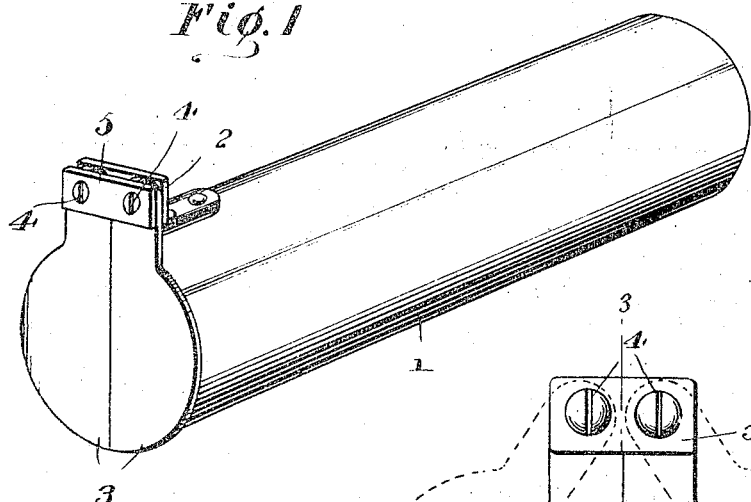
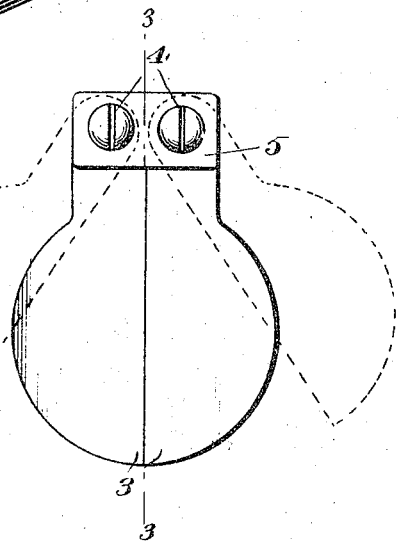
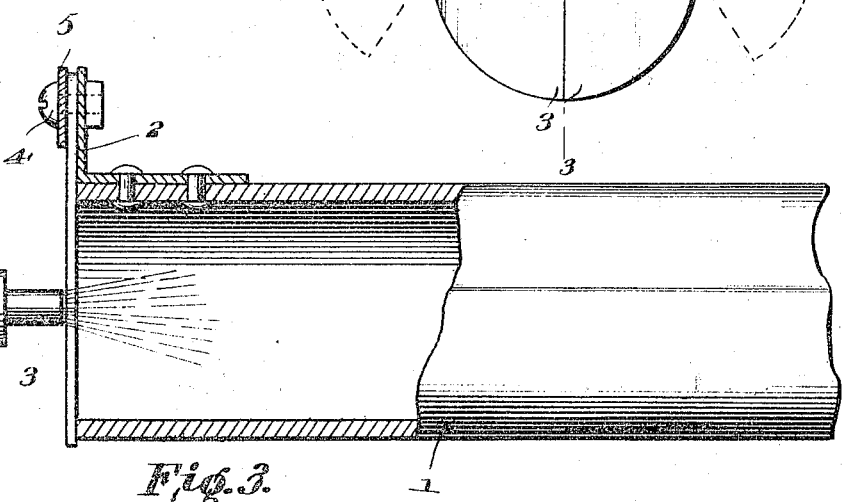
Inventor
S. G. Johnston,
By Victor J. Evans
Attorney
Witnesses
Frederick W. Ely.
R. W. Ackman, Jr.

UNITED STATES PATENT OFFICE.

STEPHEN G. JOHNSTON, OF BARBOURSVILLE, WEST VIRGINIA.

BURNER.

1,134,863.  Specification of Letters Patent.  Patented Apr. 6, 1915.

Application filed September 2, 1914. Serial No. 859,881.

*To all whom it may concern:*

Be it known that I, STEPHEN G. JOHNSTON, a citizen of the United States, residing at Barboursville, in the county of Cabell and State of West Virginia, have invented new and useful Improvements in Burners, of which the following is a specification.

The invention relates to an improvement in a mixer, particularly designed for use in kilns and comprehending a means whereby the heating effect of the burner may be readily and accurately controlled.

The main object of the present invention is the provision of a mixer wherein admission of air or oxygen to the flame is readily and conveniently controlled from beyond the kiln, the burner as a whole being readily introduced or removed from the kiln when desired.

The invention in the preferred form of details will be described in the following specification, reference being had particularly to the accompanying drawings, in which:—

Figure 1 is a perspective view illustrating the improvement. Fig. 2 is an end elevation of the mixing tube. Fig. 3 is a section on the line 3—3 of Fig. 2.

Referring to the drawings, wherein like parts are indicated by similar reference numerals throughout, the improved mixer comprises a tube 1 of appropriate length and diameter. Secured to the outer wall of the tube at one end is a right angled bracket plate 2, vertical section of which is in a plane with one end edge of the tube. Pivotally mounted upon the vertical portion of the bracket plate are shutters 3, each including a semi-circular portion approximating one-half the area of the end of the tube and an extension therefrom which is pivotally secured in the bracket by a bolt 4. The shutters are arranged side by side so that their straight edges are in edge contact when the shutters are in closed position, that is when they are in closed position to close the end of the tube. The bolts are connected above the shutters by tie plate 5, and the nuts on the ends of the bolts are of such size and so located as to prevent their movement and hence prevent loosening of the connection in the operation of the shutters.

In use, the burner tip is introduced into the mixer at the shutter end, and by adjusting the latter, the degree of flame and heat may be readily controlled. The simplicity of the structure permits it to be used in any desired position, and through the adjustment of the shutters an efficient control of the degree of heat is secured.

What is claimed is:—

A mixer comprising a tubiform body, an L-shaped bracket fixed exteriorly to the body at one end thereof, and a pair of shutters pivotally connected to the bracket and each including a semi-circular portion approximately one-half the area of the end of the body, and an extension for the pivotal connection thereof with the said bracket whereby on the closing of the shutters the edges adjacent to each other will contact throughout the extent thereof for completely closing the said body.

In testimony whereof I affix my signature in presence of two witnesses.

STEPHEN G. JOHNSTON.

Witnesses:
S. W. KING,
N. M. THORNBURG.